PATENTED OCT 3 1972

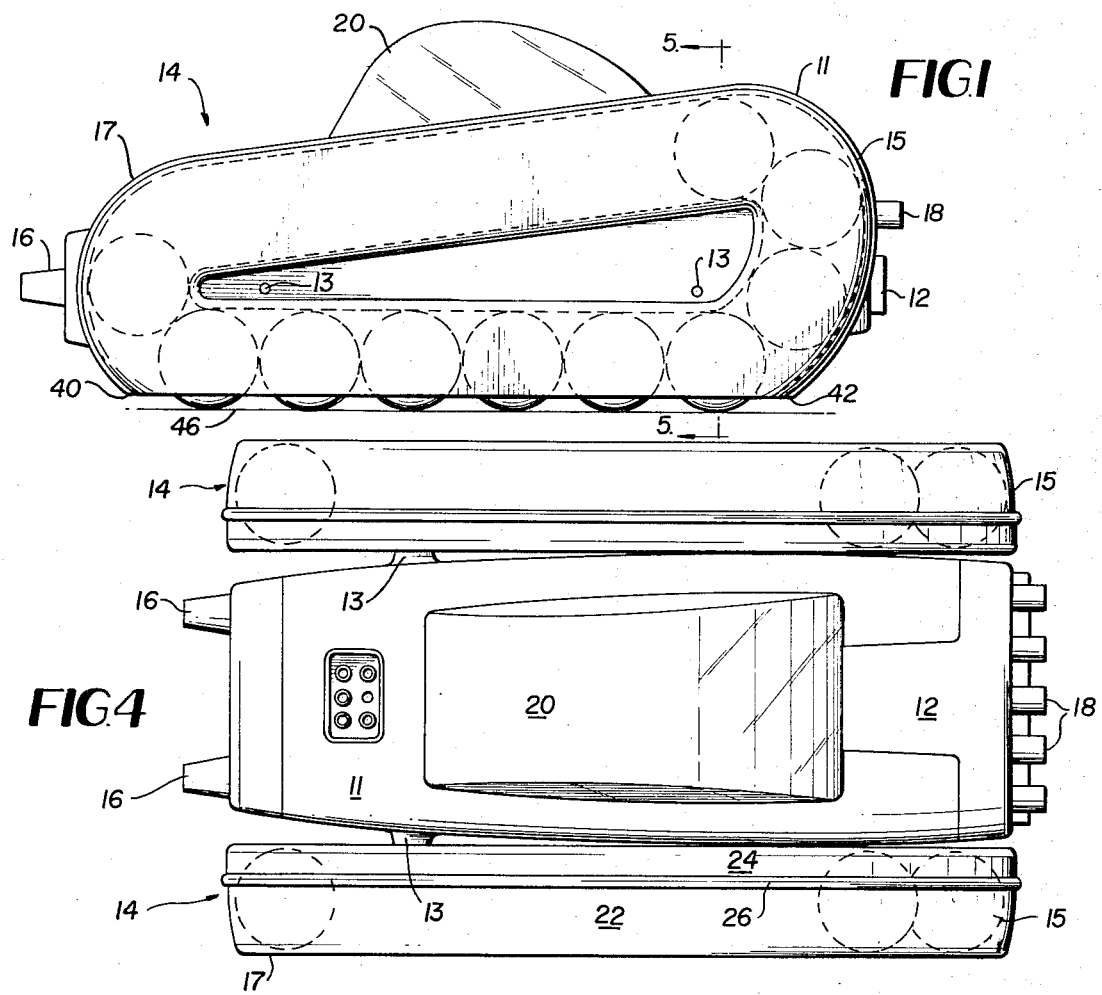
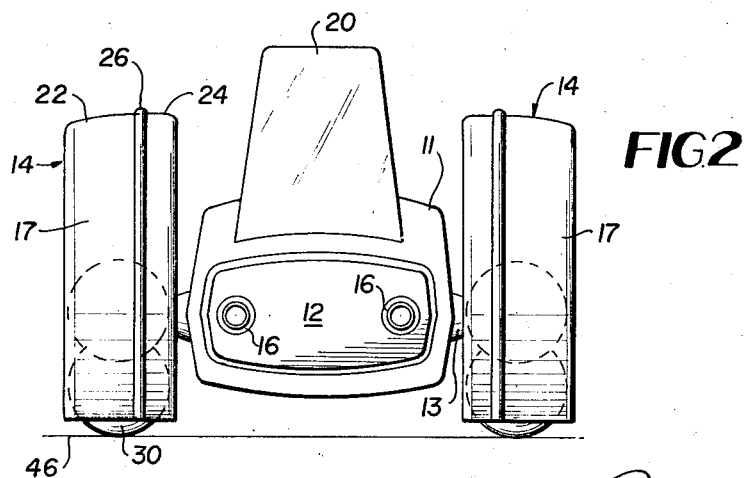
INVENTOR
ARNOLD E. BROWN
BY *Raymond N. Matson*
THEIR PATENT AGENT

INVENTOR
ARNOLD E. BROWN

BY Raymond N. Matson

THEIR PATENT AGENT

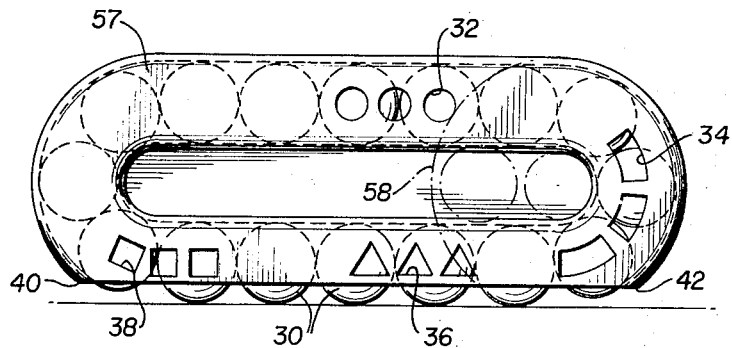
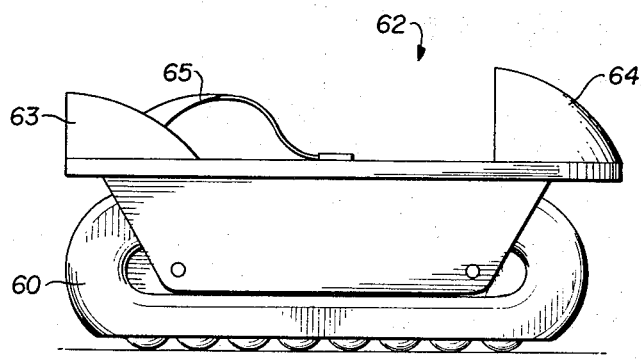
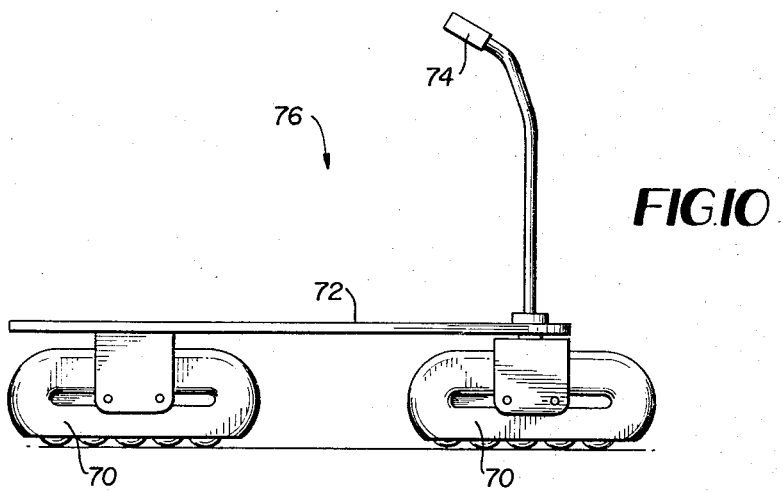
INVENTOR
ARNOLD E. BROWN
BY Raymond N. Matson
THEIR PATENT AGENT

ENDLESS-TRACK-SUPPORTED VEHICLE

This invention relates generally to vehicles and more particularly to a novel endless track for supporting a vehicle.

Vehicle-supporting endless tracks are well known in the art and usually comprise an endless belt having a tread which passes about a plurality of rollers or wheels. Such tracks are subjected to severe wear and breakage of the belt, its treads or links often occurs.

The main object of the present invention is to provide a vehicle-supporting endless track which will obviate the above and other disadvantages and complexities characterizing known endless tracks.

An important object of the present invention is to provide a vehicle having an improved endless track which is extremely simple in design but is rugged and of long life in use.

Another important object of the present invention is to provide an improved endless track formed of ground engaging balls or rollers confined in a race and successively movable into ground engaging position.

Other objects and advantages of the invention will become apparent during the course of the following description.

In the drawings, several embodiments of the invention are shown; In these showings:

FIG. 1 is a side elevational view of one form of the invention in which the vehicle employs a plurality of laterally spaced endless tracks for supporting the vehicle body;

FIG. 4 is a top plan view thereof;

FIG. 8 is a similar view of another modification thereof;

FIG. 9 is a side elevational view of another form of the invention in which the vehicle is in the form of a roller skate; and FIG. 10 is a similar view of yet another embodiment of the invention in which the vehicle is shown as a child's scooter.

Figure 2:
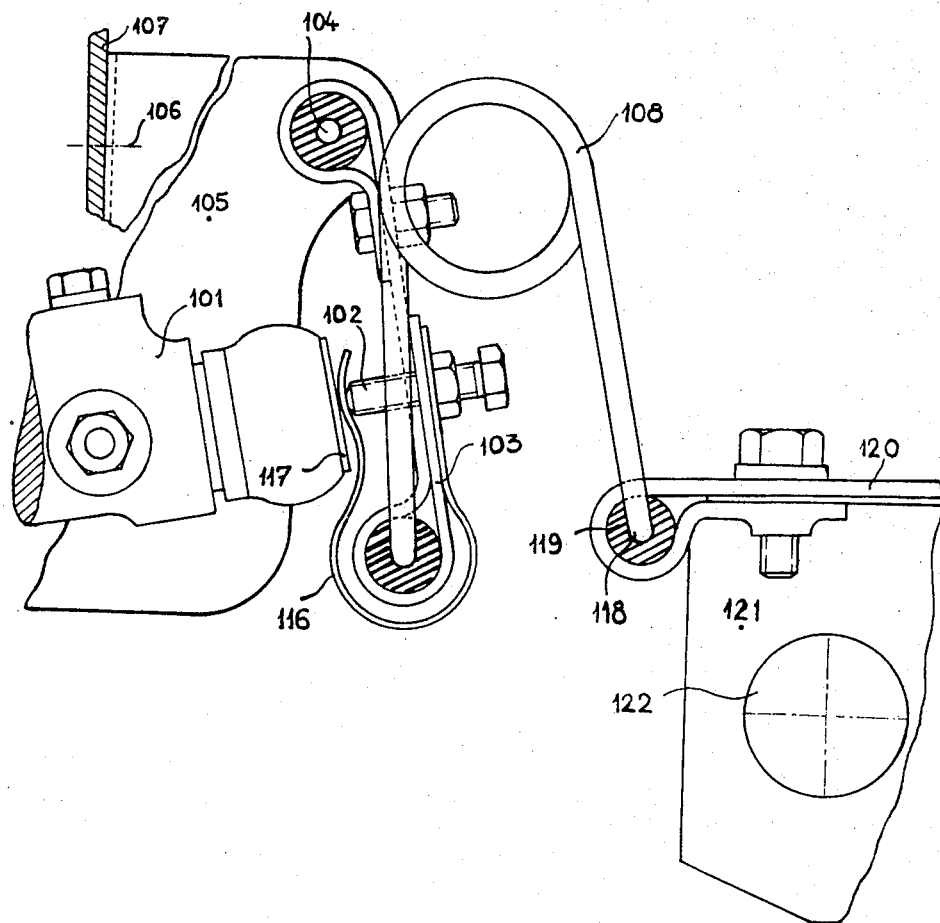
FIG. 2 is a front elevational view thereof.
Figure 3:
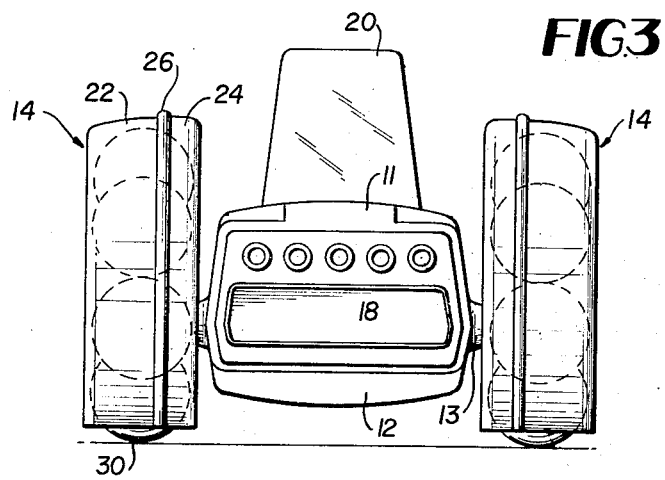
FIG. 3 is a rear elevational view thereof.

Referring to the drawings, it will be seen that the vehicle may take any of many desirable forms and may be a trailer or self-powered, a toy or a real load carrying vehicle with the load carrying strengths of all parts being suitably chosen.

In FIGS. 1-6 inclusive, the vehicle 11 is shown as a push or pull toy for a child and comprises a load carrying platform or body 12 supported on opposite sides by front and rear axles 13 fixed to parallel endless tracks 14. The vehicle is provided with a pair of headlights 16, propelling jet nozzles 18, and a transparent roof 20 within which a suitable toy figure (not shown) may be placed.

The endless tracks 14 are identical but oppositely disposed and each comprises an endless ball or roller confining structure such as spaced connected wires or as shown, a tube or a pair of mating channels 22, 24 defining a ball race suitably secured together as by cement, etc., along the flange 26, and a plurality of hollow, light weight vari-colored balls 30. The tracks are preferably formed of transparent high impact plastic so that the vari-colored balls 30 may be seen by the child as they move around their races.

Optionally, the plastic need not be transparent but may be provided with a plurality of round, rectangular, triangular or square perforations as shown respectively at 32, 34, 36 and 38 in FIG. 8. This not only enables the moving balls to be seen but effects a saving of material and in weight. The joined ball race channels 22, 24 may be other than square in cross section as indicated at 28 in FIG. 5 as long as the balls are properly confined and are provided with adequate clearance so as to roll freely.

Figure 5:
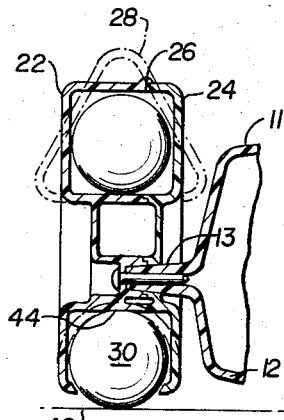
FIG. 5 is a transverse, vertical sectional view of one of the endless tracks employing balls, taken on the line 5—5 of FIG. 1.
Figure 7:
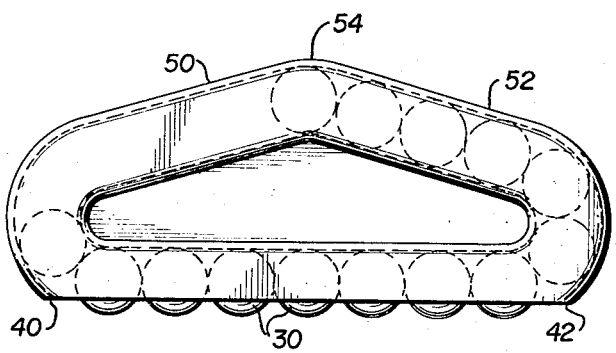
FIG. 7 is a side elevational view of a modified form of the endless track.

The races are closed except on the bottom from the point 40 to point 42 FIGS. 1, 7 and 8). Thus, the weight of the vehicle rests on the ground engaging balls at point 44 in the lower ball race which in turn bear on the floor or supporting surface 46 (FIG. 5). It will be noted that the upper ball race of the endless tracks 14 (FIGS. 1-5 inclusive) slope from the rear toward the front for gravity return of the ground engaging balls to the front of the races.

It will be appreciated that as the vehicle 11 moves forwardly along a supporting surface, the several balls 30 in engagement therewith contribute the necessary rolling motion. As the balls move rearwardly, they are successively pushed upwardly around the rear curved race portion 15 by following balls and roll by gravity to the front curved portion 17 where they again become ground engaging and vehicle supporting.

Thus, the vari-colored balls 30 have a two speed motion as they move through the races which tends to increase their attractiveness and the attention span of the child. Furthermore, inasmuch as the races of the tracks 14 are not full of balls, movement of the vehicle in a reverse direction is limited as each ball has to be pushed up the inclined upper race by a succeeding ball and the number of balls in ground engaging position is reduced.

The limitation as to the amount of movement in reverse before fewer balls engage the ground, as mentioned above, may be rectified in two ways. As shown in FIG. 7, the endless tracks may slope both forwardly as at 50 and rearwardly as at 52 from a midpoint 54. This arrangement permits the balls or rollers to only partially occupy the ball races and thus have the two speed rolling motion enabled by the form shown in FIGS. 1-5. Secondly, as shown in FIG. 8, the ball races 57 may be full of balls 30 in rolling contact with each other so that each pushes its adjacent ball or roller around. As long as the ball races are full, the shape of the endless tracks is immaterial and may be as shown in FIGS. 1-5, 7, 8, or round as shown in dotted lines 58 in FIG. 8.

Figure 6:
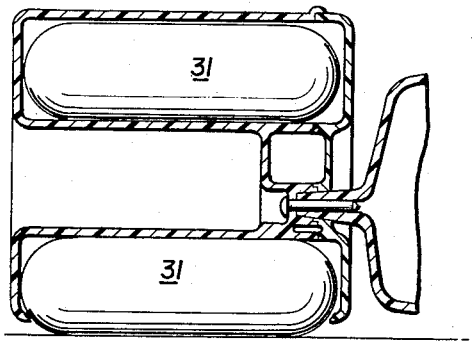
FIG. 6 is a similar view of a track employing rollers.

The use of ground engaging and supporting rollers 31 instead of balls is illustrated in FIG. 6, other relatively cooperating parts remaining the same.

It will be readily apparent that a vehicle may have a pair of laterally spaced, endless tracks 14 as described, a single supporting endless track 60 as shown in FIG. 9 wherein the vehicle takes the form of a roller skate 62 having heel and toe confining members 63, 64 and a restraining strap 65, or a pair of endless tracks 70 in tandem. As shown in FIG. 10, the tandem arranged tracks 70 support the platform 72 of a child's scooter 76 which is suitably controlled and steered by a handle 74.

It is to be understood that the forms of the invention herewith shown and described are to be taken as preferred examples of the same and that various changes in the shape, size and arrangement of parts may be resorted to without departure from the spirit of the invention or the scope of the subjoined claims.

What is claimed is:

1. An endless track capable of supporting a load comprising, in combination, an endless confining structure defining a race having a bottom opening including inturned flanges, and a plurality of unconnected, rotatable spherical members confined in but not filling said race by said flanges for universal, independent rotation therein and rotatable into successive ground engaging track-supporting position through said opening upon movement of the track, said confining structure including a slope for gravity movement of said spherical members therealong and being transparent for observation of said rotatable members.

2. The combination recited in claim 1 wherein said confining structure is formed by a channel.

3. The combination recited in claim 1 wherein said confining structure includes a second, oppositely disposed slope for the gravity movement of said rotatable members in either direction.

4. The combination recited in claim 1; and a platform mounted on the track for supporting a load.

5. The combination recited in claim 1; a second endless track spaced from the recited track, and a load supporting platform connecting and mounted on the two tracks.

* * * * *